F. W. & C. J. BEHRENDT.
WEEDING DEVICE.
APPLICATION FILED MAR. 19, 1912.
1,039,012. Patented Sept. 17, 1912.
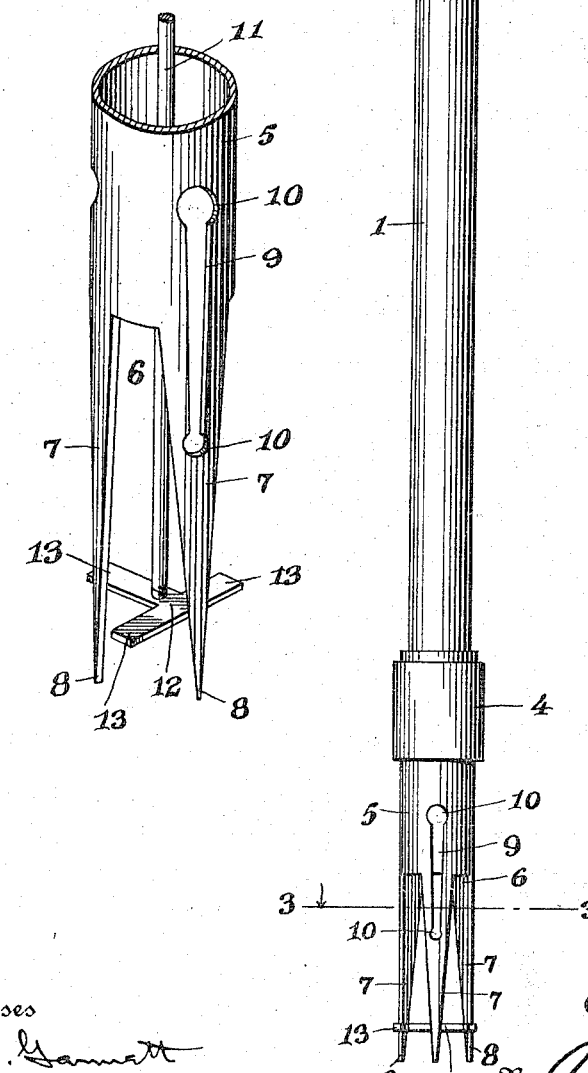

UNITED STATES PATENT OFFICE.

FRED W. BEHRENDT AND CARL J. BEHRENDT, OF ZANESVILLE, OHIO.

WEEDING DEVICE.

1,039,012.

Specification of Letters Patent. Patented Sept. 17, 1912.

Application filed March 19, 1912. Serial No. 684,674.

*To all whom it may concern:*

Be it known that we, FRED W. BEHRENDT and CARL J. BEHRENDT, citizens of the United States, residing at Zanesville, in the county of Muskingum and State of Ohio, have invented new and useful Improvements in Weeding Devices, of which the following is a specification.

This invention relates to weeding devices, and it has for its object to produce a simple and efficient device whereby weeds and noxious plants may be pulled or extracted from the ground without danger of cutting the leaves or of breaking the roots, enabling the entire plant to be extracted and disposed of.

A further object of the invention is to provide a simple and improved device of the character described having means whereby the weed or plant when extracted from the ground may be detached from the device in a rapid and efficient manner, leaving the device in condition for a repetition of the operation.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—Figure 1 is a side elevation partly in section of a device constructed in accordance with the invention. Fig. 2 is a perspective detail view of the lower portion of the device. Fig. 3 is a transverse sectional view taken on the line 3—3 in Fig. 1.

Corresponding parts in the several figures are denoted by like characters of reference.

The improved weed extractor is composed of a tubular body member 1 which may consist of a piece of ordinary gas pipe, the upper end of which is provided with a T coupling 2 with which tubular arms or handles 3, 3 are connected, as shown. The tubular body 1 has at its lower end a coupling sleeve 4 with which the bit 5 is connected, said bit consisting of a piece of tubing which is provided at its lower end with an elongated notch or recess 6 forming prongs 7 which are beveled to form sharp points 8 at the lower ends thereof. The bit is preferably notched or recessed to form three prongs, a greater number being not advisable in order that the said prongs may be made of proper strength. The bit is also provided with slots 9 formed partly in the prongs 7 and extending upwardly therefrom, the upper and lower ends of said slots being expanded to form the enlarged portions or apertures 10.

Arranged for vertical movement within the tubular body is a rod 11, the lower end of which is threaded to receive a follower 12 having arms 13 that extend through the recesses or notches 6 intermediate the prongs 7. The upper end of the rod 11 extends through an aperture in the T-head 2 and is bent to form a handle 14 whereby it may be conveniently manipulated.

In the operation of this device, the bit is placed in engagement with the stalk of the plant that is to be extracted, said stalk being preferably bent slightly to one side and inserted through one of the notches or recesses 6, being straddled by the prongs 7, the follower 12 being meanwhile at the upward limit of its movement. The device is now put into the ground as far as it will go, surrounding the root of the plant, after which by twisting the device by means of the handles 3, the root will be twisted and loosened. Portions of the stalk and of the root will also be permitted to project through the slots 9, where they will become embedded so that when the device is withdrawn from the ground, the plant with the root intact will be extracted from the ground. By pushing the follower 12 in a downward direction by means of the rod 11, the plant will be ejected from the extractor which will now be ready for a repetition of the operation. It will be seen that the entire operation may be performed in a rapid and efficient manner without necessity for the hands of the operator coming in contact with the noxious plant or weed.

Having thus described the invention, what is claimed as new, is:—

In a weed extractor, a tubular body, a tubular bit having a circumferential series of prongs, said prongs being provided with slots extending upwardly through the body of the bit and having terminal enlargements, and a follower movable longitudinally of the bit and constituting an ejector.

In testimony whereof we affix our signatures in presence of two witnesses.

FRED W. BEHRENDT.
CARL J. BEHRENDT.

Witnesses:
A. G. FULKERSON,
JOHN G. HARLAN.